US012595574B2

(12) United States Patent
Beh et al.

(10) Patent No.: US 12,595,574 B2
(45) Date of Patent: Apr. 7, 2026

(54) SYSTEM AND PROCESS FOR ANTHRAQUINONE FUNCTIONALIZATION

(71) Applicants: Quino Energy, Inc., San Leandro, CA (US); President and Fellows of Harvard College, Cambridge, MA (US)

(72) Inventors: Eugene Beh, Menlo Park, CA (US); Meisam Bahari, Alameda, CA (US); Min Wu, Greenbelt, MD (US); Michael Aziz, Cambridge, MA (US); Roy Gordon, Cambridge, MA (US)

(73) Assignees: Quino Energy, Inc., San Leandro, CA (US); President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 18/257,258

(22) PCT Filed: Jun. 9, 2022

(86) PCT No.: PCT/US2022/032890
§ 371 (c)(1),
(2) Date: Jun. 13, 2023

(87) PCT Pub. No.: WO2022/271456
PCT Pub. Date: Dec. 29, 2022

(65) Prior Publication Data

US 2024/0052503 A1 Feb. 15, 2024

Related U.S. Application Data

(60) Provisional application No. 63/215,079, filed on Jun. 25, 2021.

(51) Int. Cl.
*C25B 3/07* (2021.01)
*C25B 3/29* (2021.01)
(Continued)

(52) U.S. Cl.
CPC .................. *C25B 3/07* (2021.01); *C25B 3/29* (2021.01); *C25B 11/061* (2021.01); *C25B 15/083* (2021.01); *H01M 8/188* (2013.01)

(58) Field of Classification Search
CPC ....... C25B 3/07; C25B 11/061; C25B 15/083; C25B 3/29
See application file for complete search history.

(56) References Cited

U.S. PATENT DOCUMENTS 2,941,865 A 6/1960 Gonze et al.
4,311,565 A 1/1982 Bersier et al.
(Continued)

FOREIGN PATENT DOCUMENTS

CN 109608374 A 4/2019
CN 111825539 A 10/2020
(Continued)

OTHER PUBLICATIONS

Preston "Preparation of 3,4-dihydroanthracen-1(2H)-ones. A synthetic approach to is 1 andicin and digitopurpone via difluoro[anthracen-1(2H)-onato-O 1,0 9]boron chelates",Journal of the Chemical Society, Perkin Transactions 1, Jan. 1, 1983, pp. 1001,1003-1005.
(Continued)

*Primary Examiner* — Zulmariam Mendez
(74) *Attorney, Agent, or Firm* — Merchant & Gould P.C.

(57) ABSTRACT

The invention relates to the synthetic functionalization of an anthraquinone molecule that is substituted with at least one hydroxyl or amino group. In some aspects of the invention a mixture containing said anthraquinone starting material, an aldehyde, a base, an optional solvent, and an optional catalyst is reacted with hydrogen and then with an oxidant. In other aspects of the invention the synthetic functional-
(Continued)

ization of the anthraquinone molecule takes place electrochemically rather than chemically, through the use of a divided electrolytic cell.

25 Claims, 3 Drawing Sheets

(51) Int. Cl.

| | |
|---|---|
| ***C25B 11/061*** | (2021.01) |
| ***C25B 15/08*** | (2006.01) |
| ***H01M 8/18*** | (2006.01) |

(56) References Cited

U.S. PATENT DOCUMENTS

| | | | | |
|---|---|---|---|---|
| 5,350,425 | A | 9/1994 | Carver | |
| 10,227,281 | B2 | 3/2019 | Riedel et al. | |
| 2013/0105330 | A1 * | 5/2013 | Teamey | C25B 13/08 205/349 |
| 2015/0243991 | A1 * | 8/2015 | Huskinson | H01M 8/083 429/105 |
| 2017/0291916 | A1 * | 10/2017 | Millard | H01M 8/188 |
| 2023/0286217 | A1 | 9/2023 | Belocon et al. | |

FOREIGN PATENT DOCUMENTS

| | | | |
|---|---|---|---|
| EP | 0185569 | A1 | 6/1986 |
| GB | 2038809 | A | 7/1980 |
| JP | S57032243 | A | 9/1983 |
| JP | S58150935 | A | 9/1983 |
| JP | H0394085 | A | 4/1991 |
| JP | 2018177660 | A | 11/2018 |

OTHER PUBLICATIONS

L.M. Zhao, F.Y. Ma, H.S. Jin, J. Ma, H. Wang, C.Z. Fu, “Facile Installation of a Hydroxyalkyl Group into Hydroxyanthraquinones and Aminoanthraquinones through the Modified Marschalk Reaction,” Anthracycline Antitumor Agent Synthesis, European Journal of Organic Chemistry, vol. 2013, No. Sep. 19, 2013 (Sep. 19, 2013), pp. 7193-7199.

K. Krohn, “Regioselective Alkylation of 1,4,5-Trihydroxy-9,10-anthraquinone with Formaldehyde and Glyoxylic Acid,” Angewandte Chemie International Edition 1979, 18(8), 621-622.

F. Suzuki, S. Trenbeath, R. D. Gleim, C. J. Sih, “Total Synthesis of Adriamycinone, Regiospecific Synthesis of Anthracyclinones via Base-Catalyzed Cyclization,” Journal of the American Chemical Society 1978, 100, 2272-2273.

K. Lin, Q. Chen, M. R. Gerhardt, L. Tong, S. B. Kim, L. Eisenach, A. W. Valle, D. Hardee, R. G. Gordon, M. J. Aziz, M. P. Marshak, “Alkaline quinone flow battery,” Science 2015, 349, 1529-1532.

M. Wu, et al., “High-performance anthraquinone with potentially low cost for aqueous redox flow batteries,” Journal of Materials Chemistry A, 2021 (DOI: 10.1039/d1ta08900e).

Y. Jing, et al., “Electrochemical Regeneration of Anthraquinones for Lifetime Extension in Flow Batteries,” ChemRxiv, Aug. 10, 2021 (DOI: 10.26434/chemrxiv-2021-x05x1).

International Search Report and the Written Opinion of the International Searching Authority in PCT/US2022/032890 dated Mar. 2, 2023, 9 pages.

A. Roessler et al., Electrocatalytic hydrogenation of vat dyes, Dyes and Pigments, vol. 54, Issue 2, 2002, pp. 141-146, ISSN 0143-7208, https://doi.org/10.1016/S0143-7208(02)00035-9.

Indian Examination Report in IN202337035306, dated Oct. 9, 2025, 7 pages.

* cited by examiner

SYSTEM AND PROCESS FOR ANTHRAQUINONE FUNCTIONALIZATION

CROSS-REFERENCE TO RELATED APPLICATION(S)

This application is a National Stage Application of PCT/US2022/032890, filed 9 Jun. 2022, which claims the priority benefit of U.S. Provisional Application No. 63/215,079, filed Jun. 25, 2021, and which applications are both hereby incorporated herein by reference.

STATEMENT REGARDING FEDERALLY SPONSORED RESEARCH

Certain aspects of the present invention were made with government support from the U.S. Department of Energy under award number DE-AC05-76RL01830 through PNNL subcontract 535264. The government has certain rights to the invention.

TECHNICAL FIELD

This invention relates generally to a synthetic organic chemistry process. More specifically, the invention relates to the synthetic functionalization of an anthraquinone molecule that is substituted with at least one hydroxyl or amino group.

BACKGROUND

The Marschalk Reaction is the reaction of a hydroxyl- or amino-substituted anthraquinone with an aldehyde in the presence of sodium dithionite to introduce an alpha-hydroxyalkyl-functional group ortho to the hydroxyl or amine substituent on the starting molecule. See L.-M. Zhao, F.-Y. Ma, H.-S. Jin, J. Ma, H. Wang, C.-Z. Fu, *European Journal of Organic Chemistry,* 2013, 7193-7199. Under certain conditions, dehydroxylation of the alpha-hydroxyalkyl-functional group subsequently takes place, leaving a methylene (—CH2-) linker between the anthraquinone core and the rest of the new functional group. The reaction works with a variety of aldehydes, including formaldehyde, acetaldehyde, benzaldehyde, glyoxylic acid, and so on. See e.g. K. Krohn, *Angewandte Chemie International Edition* 1979, 18, 621-622. The reaction can be intermolecular or intramolecular. See F. Suzuki, S. Trenbeath, R. D. Gleim, C. J. Sih, *Journal of the American Chemical Society* 1978, 100, 2272-2273.

In all reported examples of the (alpha-hydroxy)alkylation or alkylation of hydroxyl- or amino-substituted anthraquinones, the reducing agent used is sodium dithionite. Replacement of sodium dithionite with a different, cheaper, reducing agent could allow the same reaction to proceed at lower cost.

DETAILED DESCRIPTION

The mechanism of the Marschalk reaction starts with the reduction of the 9,10-anthraquinone core of the substituted anthraquinone starting material to a 9,10-dihydroxyanthracene core. This reduced starting material is what then reacts with the aldehyde to form a carbon-carbon bond.

It is known that 9,10-anthraquinones can be easily reduced to the corresponding 9,10-dihydroxyanthracenes using other reactants such as hydrogen gas, optionally in the presence of a catalyst such as palladium supported on a carbon substrate. See G. Max, L. Emile, U.S. Pat. No. 2,941,865, filed Oct. 16, 1956. Alternatively, the reduction can be realized electrochemically such as in a half-cell of a flow battery. See K. Lin, Q. Chen, M. R. Gerhardt, L. Tong, S. B. Kim, L. Eisenach, A. W. Valle, D. Hardee, R. G. Gordon, M. J. Aziz, M. P. Marshak, *Science* 2015, 349, 1529-1532.

However, the use of reducing agents other than sodium dithionite in the Marschalk reaction is unknown. This invention features the synthesis of anthraquinone derivatives through a process analogous to the classical Marschalk reaction, but with reducing agents other than sodium dithionite or other dithionite salts.

Figure 1:
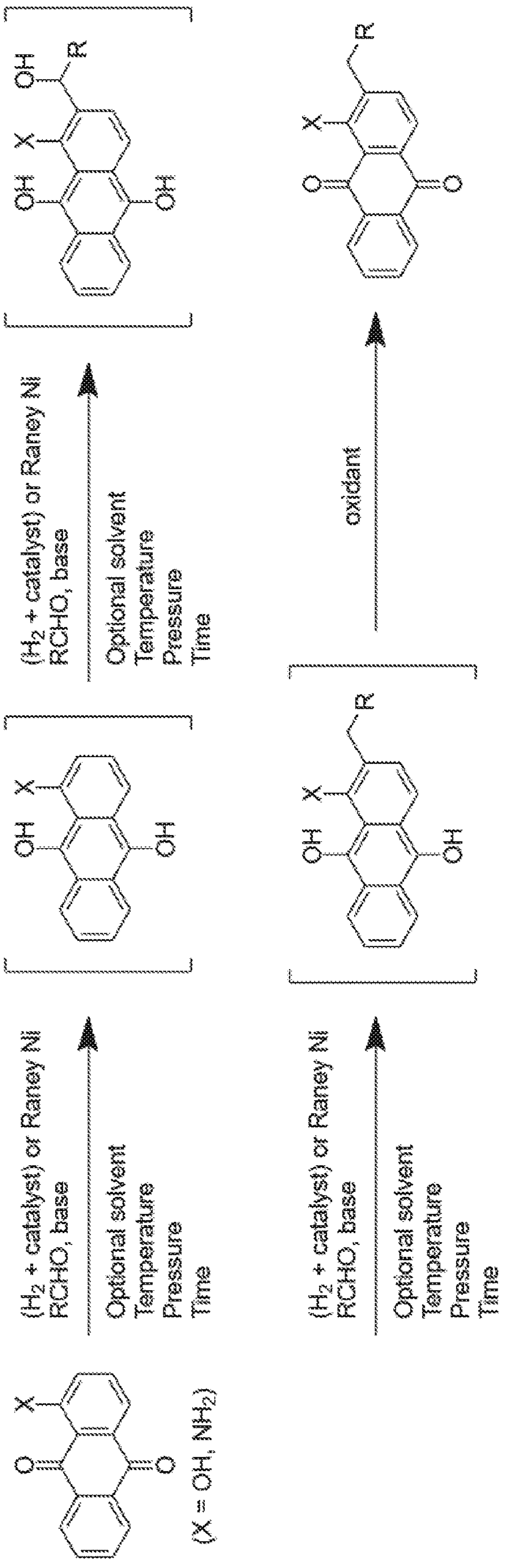
FIG. 1 depicts a synthetic scheme for the (alpha-hydroxy) alkylation or alkylation of a substituted anthraquinone starting material through catalytic reduction of the substituted anthraquinone starting material with hydrogen gas in accordance with certain embodiments.

In one aspect of the invention, summarized in FIG. 1, a substituted anthraquinone starting material, an aldehyde, a base, an optional solvent, and an optional catalyst are mixed in a reaction vessel an exposed to an atmosphere comprising hydrogen gas. The reaction may be heated, cooled, or held at different temperatures throughout the duration of the reaction. Depending on the reaction temperature, the (alpha-hydroxy)alkylated product is favored or the dehydroxylated, alkylated product is favored. After a predetermined amount of time, an oxidant is introduced to the reaction mixture. After a further predetermined amount of time, the reaction product is isolated from the reaction mixture and optionally purified through conventional means familiar to one skilled in the art, such as precipitation, filtration, distillation, sublimation, recrystallization, solvent extraction, washing, chromatography, centrifugation, and so on.

In some embodiments of the invention, the substituted anthraquinone starting material comprises of Formula I:

Formula I

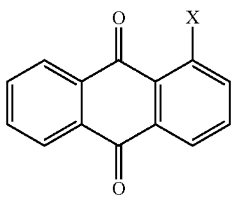

(X = OH or $NH_2$)

wherein X is selected from the group comprising of: a hydroxy or amino group in the 1-position, and the anthraquinone is unsubstituted (i.e. carbon bonded to hydrogen) in the 2-position. It will be appreciated by one skilled in the art that other substituents present on the substituted anthraquinone starting material may change the position numbering of the aforementioned hydroxy or amino group, as well as the unsubstituted carbon atom ortho to it, but the position numbering will not affect the general reactivity, only the relative positioning of the hydroxy group on the substituted anthraquinone and the unsubstituted carbon atom next to it. In some embodiments of the invention, the aldehyde is covalently attached to the anthraquinone derivative, and the reaction proceeds intramolecularly, or under certain conditions, could proceed to form dimers, or cyclamers, or oligomeric or polymeric chains.

In some embodiments of the invention, the base is selected from the group comprising of: an inorganic hydroxide, a metal alkoxide, an amine, or an amidine or mixtures thereof. In particular embodiments of the invention, the base is an alkali metal hydroxide such as sodium hydroxide or potassium hydroxide. In other embodiments of the invention, the base is a metal alkoxide or an alkali metal alkoxide such as sodium methoxide or potassium tert-butoxide. In other embodiments of the invention, the base is an amine or a trialkylamine such as triethylamine or diisopropylethylamine. In other embodiments, the base is an amidine wherein the amidine is a non-nucleophilic base such as 1,8-diazabicycloundec-7-ene (DBU) or 1,5-diazabicyclo [4.3.0]non-5-ene (DBN).

In general, most aldehydes can undergo the reaction, analogously to the traditional Marschalk Reaction described in the literature above. In some embodiments of the reaction, the aldehyde is a water-soluble aldehyde such as formaldehyde or acetaldehyde. In other embodiments of the reaction, the aldehyde is an organic compound such as benzaldehyde that is only sparingly soluble or insoluble in water but is soluble in organic solvents. In still more embodiments of the invention, the aldehyde, such as glyoxylic acid, contains an acidic group that imparts solubility when mixed with the base.

In some embodiments of the invention, the aldehyde can reversibly interconvert between a form that has a free aldehyde group and a form in which a molecule of water or alcohol has been added to the aldehyde group thus forming a gem-diol or a hemiacetal respectively. In further aspects of the invention, the alcohol group is located on the same molecule as the aldehyde and the reversible addition takes place intramolecularly. In other aspects of the invention, the aldehyde functional group forms upon ring opening to an open chain form during the course of the reaction. Examples of such "transient" aldehydes are reducing sugars including but not limited to glucose, galactose, fructose, mannose, xylose, arabinose, glyceraldehyde, lactose, cellobiose, and maltose. These reducing sugars can exist as either the D- or the L-enantiomer, or a mixture of the two, or a racemic mixture. It will be appreciated by one skilled in the art that any reducing sugar may be used in the embodiments described herein. In other embodiments of the reaction, a non-reducing sugar may be used which then converts into an aldehyde-containing reducing sugar during the course of the reaction. An example of such a non-reducing sugar is fructose, which can convert into either glucose or mannose, both of which are reducing sugars.

In some embodiments of the invention, the base and/or the aldehyde act as the solvent. In other embodiments of the invention, the solvent is a separate species such as water, methanol, ethanol, isopropanol, 1,4-dioxane, N,N-dimethylformamide, and so on. In other embodiments of the invention, the solvent comprises more than one solvent, such as a water-ethanol mixture, a methanol-N,N-dimethylformamide mixture, a water-1,4-dioxane mixture, and so on. It will be appreciated by one skilled in the art that any polar, protic or aprotic solvent and mixtures thereof may be used in the embodiments described herein.

In some embodiments of the invention, the optional catalyst is a catalyst for catalytic hydrogenation, or a pre-catalyst that is converted to the active catalyst for catalytic hydrogenation during the course of the reaction. The catalyst may be optionally supported on a substrate. Examples of catalysts include, but are not limited to, nickel on carbon, palladium on carbon, platinum on carbon, rhodium on carbon, palladium hydroxide, platinum black, platinum dioxide, Wilkinson's catalyst, Crabtree's catalyst, Shvo's catalyst, and so on.

In some embodiments of the invention, the reaction atmosphere is partially or wholly comprised of hydrogen. The reaction atmosphere can be at atmospheric pressure, lower than atmospheric pressure, or above atmospheric pressure.

In some embodiments of the invention, the oxidant is present in the gas phase and can be air, oxygen, ozone, or mixtures thereof. The oxidant can alternatively be a liquid or present in the solution phase, including but not limited to dimethylsulfoxide or hydrogen peroxide. The oxidant can be a solid such as silver(I) oxide. Combinations of different oxidants may also be employed.

In some embodiments of the invention, the catalyst is Raney Nickel and the hydrogen is already present on the surface of the catalyst, and not provided as a gas to the atmosphere of the reaction vessel.

In some embodiments of the invention, the aldehyde is introduced only after the hydrogen has been vented from the reaction vessel but before the reduced substituted anthraquinone starting material has been re-oxidized by the oxidant.

Figure 2:
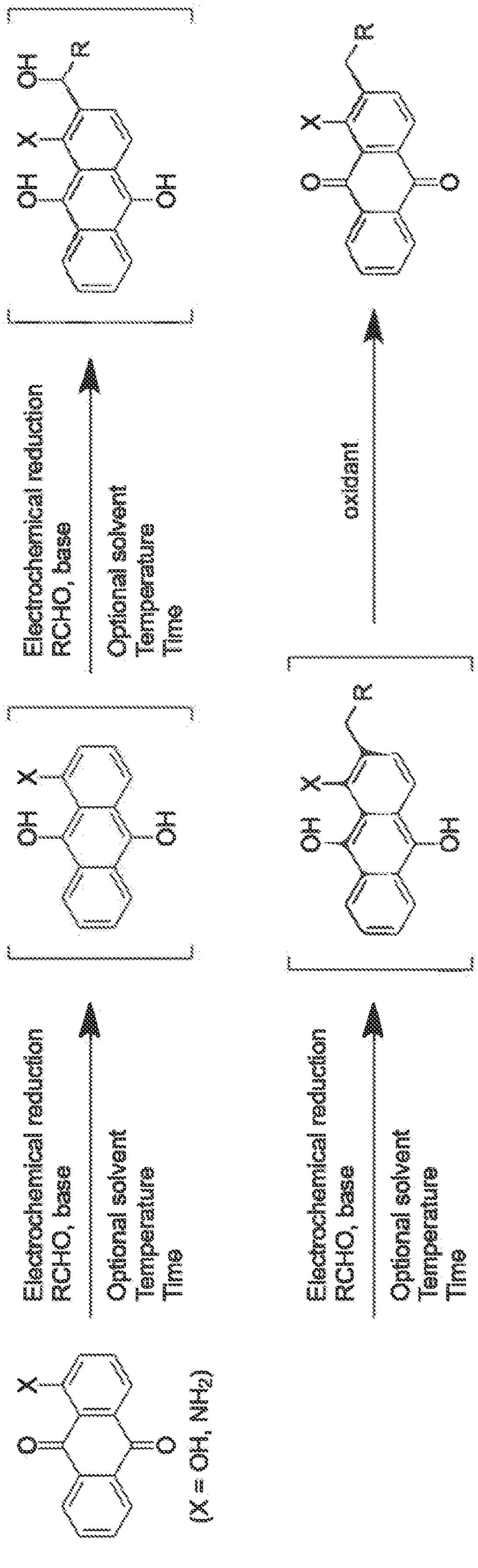
FIG. 2 depicts a synthetic scheme for the (alpha-hydroxy) alkylation or alkylation of a substituted anthraquinone starting material through electrochemical reduction of the substituted anthraquinone starting material in accordance with certain embodiments.
Figure 3:
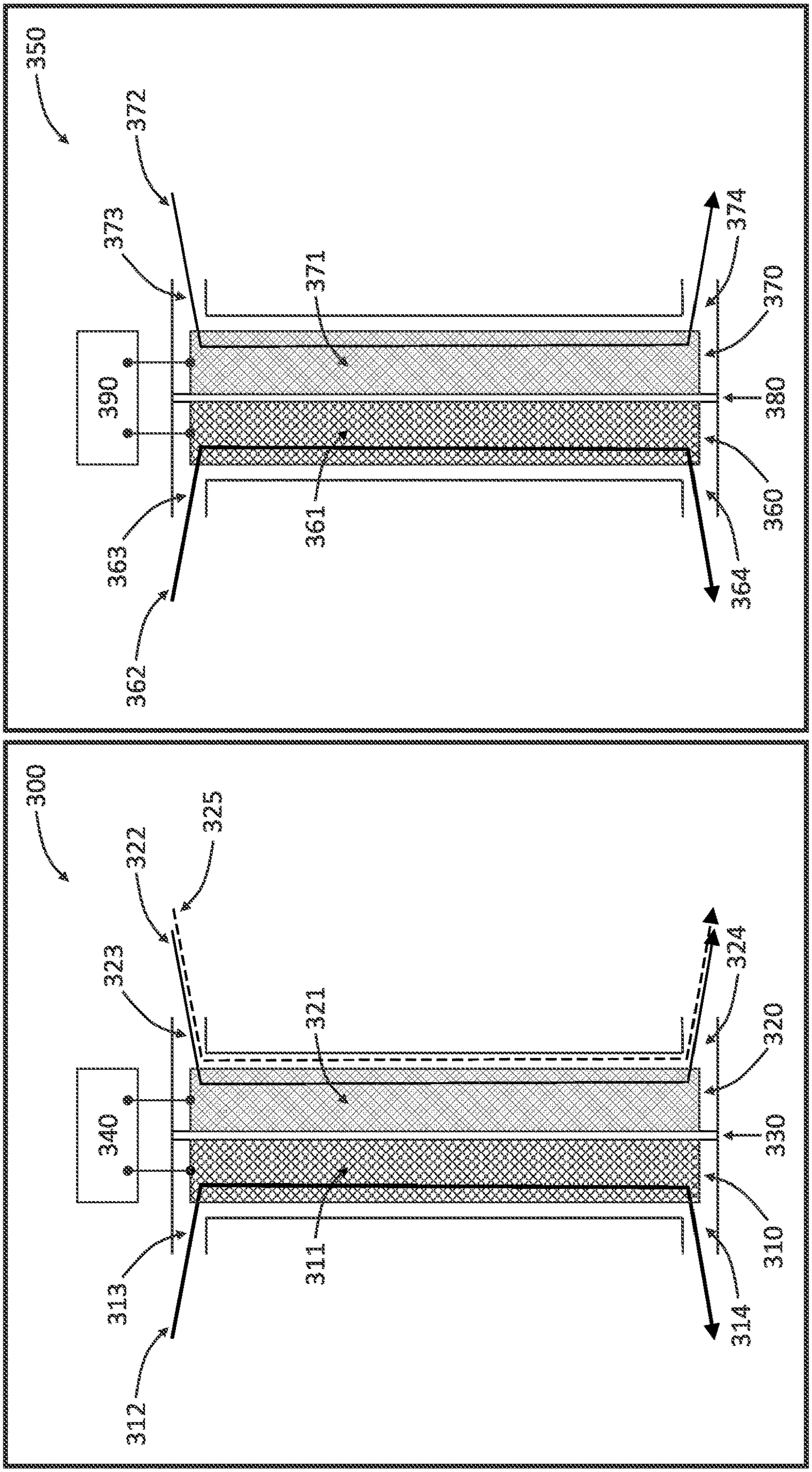
FIG. 3 depicts electrolytic cells for effecting the (alpha-hydroxy)alkylation or alkylation of a substituted anthraquinone starting material through electrochemical reduction of the substituted anthraquinone starting material in accordance with certain embodiments.

In another aspect of the invention, summarized as a chemical reaction in FIG. 2 and depicted in FIG. 3, reduction of the substituted anthraquinone starting material takes place electrochemically rather than chemically, through the use of a divided electrolytic cell 300. The divided electrolytic cell 300 comprises a first chamber 310 with a first electrode 311, and is separated from a second chamber 320 with a second electrode 321 by an ion-conducting membrane 330. There may independently be an electrocatalyst on the first electrode 311 only, an electrocatalyst on the second electrode 321 only, both the first and second electrodes 311, 321, or there can be no electrocatalyst on either the first or second electrode 311, 321.

A first fluid stream 312 comprising of a substituted anthraquinone starting material of Formula I, an aldehyde, a base, and an optional solvent is flowed through a first chamber inlet 313 into the first chamber of the electrolytic cell 310 such that the first fluid stream makes contact with the first electrode 311 and exits through a first chamber outlet 314. At the same time, a second fluid stream 322 is flowed through a second chamber inlet 323 into the second chamber of the electrolytic cell 320 such that the second fluid stream makes contact with the second electrode 321 and exits through a second chamber outlet 324. An electric potential 340 is applied to the two electrodes such that the first electrode is at a more negative potential relative to the second electrode. In some embodiments, the first electrode is the cathode, and the second electrode is the anode.

As the first fluid stream 312 passes the first electrode 311, it is electrochemically reduced. Likewise, as the second fluid stream 322 passes the second electrode 321, it is electrochemically oxidized. The first fluid stream 312 may make just one pass through the first chamber 310 of the divided electrolytic cell 300, or the fluid exiting the first chamber outlet 314 may be recirculated and flowed back into the first chamber inlet 313 multiple times. Likewise, the second fluid stream 322 may make just one pass through the second chamber 320 of the divided electrolytic cell 300, or the fluid exiting the second chamber outlet 324 may be recirculated and flowed back into the second chamber inlet 323 multiple times. The divided electrolytic cell 300, first fluid stream 312, and/or second fluid stream 322 may be heated, cooled, or held at different temperatures throughout the duration of the reaction. Depending on the reaction temperature, the (alpha-hydroxy)alkylated product is favored or the dehydroxylated, alkylated product is favored.

After a predetermined amount of time, or after a predetermined amount of charge has been passed, the first fluid stream 312 may be treated in one of several ways described below and the reaction product may be subsequently isolated from the treated first fluid stream and optionally purified through conventional means familiar to one skilled in the art. The threshold amount of charge to be passed may be pre-determined by examining the theoretical amount of charge required for the reaction to proceed to completion. In FIG. 2, the anthraquinone starting material requires two equivalents of electrons to be reduced to the 9,10-dihydroxyanthracene derivative which then reacts with the aldehyde to form the (alpha-hydroxy)alkylated intermediate. This intermediate then undergoes intramolecular disproportionation to produce the alkylated product and a re-oxidized anthraquinone core, which can accept two more electrons. In this case, the threshold amount of charge is 4 equivalents with respect to the amount of anthraquinone starting material originally present. In the case where two equivalents of aldehyde react with one molecule of anthraquinone starting material, the theoretical amount of charge to be passed would be 6 equivalents. Greater threshold amounts of charge can be set in order to account for process inefficiencies such as the effect of oxygen reoxidizing the reaction mixture, Coulombic efficiencies arising from side reactions and so on. Conversely, if the (alpha-hydroxy)alkylated intermediate is actually the desired product, or if an (alpha-hydroxy)alkylated material is the starting material and the dehydroxylated, alkylated material is the desired product, then fewer equivalents of charge (e.g. around two equivalents) could be used as the reaction end point.

Alternatively, a threshold voltage (if current is passed galvanostatically) or a threshold current or current density (if current is passed potentiostatically) could be used in place of the predetermined amount of time or charge passed, if the alkylated (non-alpha-hydroxylated) product is the desired product, towards the end of the reaction there remain fewer and fewer 9,10-anthraquinone cores in the reaction mixture that are available to accept electrons. This manifests as a sharp increase in the voltage if current is passed galvanostatically, or a decrease in the current if current is passed potentiostatically. It is advisable to set a threshold upper voltage or a threshold lower current (or current density), beyond which current flow is stopped, in order to minimize the amount of potential side reactions. The threshold voltage can be defined as a fixed number, for example, >0.5 V/cell, >1.0 V/cell, >1.5 V/cell, >1.6 V/cell, >1.7 V/cell, >1.8 V/cell, >1.9 V/cell, >2.0 V/cell, >2.1 V/cell, >2.2 V/cell, >2.3 V/cell, >2.4 V/cell, >2.5 V/cell, and so on, or it could be defined as a percentage increase over the average voltage in the first of a certain number of equivalents of charge passed, such as >10% over the average voltage during the first equivalent of charge passed, >20% over the average voltage during the first 0.5 equivalents of charge passed, >30% over the average voltage during the first 0.5 equivalents of charge passed, >40% over the average voltage during the first 0.25 equivalents of charge passed, >50% over the average voltage during the first 0.1 equivalents of charge passed, and many such combinations thereof. For example, in the case where the theoretical amount of charge that can be passed is 4 equivalents, and the cell voltage is an average of 1.5 V over the first equivalent of charge passed, a threshold voltage that is >30% over the starting voltage means the current would be stopped once the voltage exceeds 1.95 V/cell, when the current is being applied galvanostatically. Similarly, the threshold current (or current density) can be defined as a number, such as <10 A, <1 A, <0.1 A, <0.01 A, <10 mA/cm$^2$, <1 mA/cm$^2$, <0.1 mA/cm$^2$, <0.01 A/cm$^2$, and so on, or it could be defined as a percentage of the average current or current density in the first of a certain number of equivalents of charge passed, such as <10% of the average current or current density during the first equivalent of charge passed, <5% of the average current or current density during the first 0.5 equivalents of charge passed, <2% of the average current or current density during the first 0.5 equivalents of charge passed, <1% of the average current or current density during the first 0.2 equivalents of charge passed, <0.5% of the average current or current density during the first 0.25 equivalents of charge passed, <0.2% of the average current or current density during the first 0.1 equivalents of charge passed, <0.1% of the average current or current density during the first 0.1 equivalents of charge passed, and many such combinations thereof. For example, in the case where the theoretical amount of charge that can be passed is 4 equivalents, and the current density is an average of 100 mA/cm$^2$ over the first equivalent of charge passed, a threshold current density of <1% of the starting current density means the current would be stopped once the current density drops below 1 mA/cm$^2$, when the current is being applied potentiostatically. In some embodiments, current is passed galvanostatically until the cell voltage hits some threshold value, such as 1.2V, 1.4V, 1.6V, 1.8V and so on, and then the cell voltage is maintained until the current or current density drops below a threshold value as similarly specified for potentiostatic operation.

In some embodiments of the reaction, the substituted anthraquinone comprises of Formula II:

Formula II

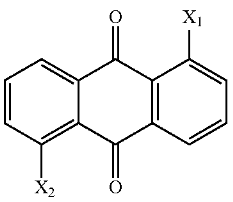

(X = OH or $NH_2$)

Wherein X is a hydroxyl or amino group. In some embodiments $X_1$ and $X_2$ are the same. In other embodiments $X_1$ and $X_2$ are different. Examples of this include 1,5-dihydroxyanthraquinone, 1,5-diaminoanthraquinone, 1-hydroxy-5-aminoanthraquinone, and so on.

In other embodiments of the reaction, the substituted anthraquinone comprises of Formula III:

Formula III

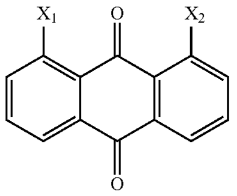

(X = OH or $NH_2$)

Wherein X is a hydroxyl or amino group. In some embodiments $X_1$ and $X_2$ are the same. In other embodiments $X_1$ and $X_2$ are different. Examples of this include 1,8-dihydroxyanthraquinone, 1,8-diaminoanthraquinone, 1-hydroxy-8-aminoanthraquinone, and so on. Anthraquinones of Formulas II and III, which comprise of two X substituents on separate aromatic rings of the same molecule, or two unsubstituted positions each ortho to the X substituents, would be able to react with two equivalents of aldehyde to form a bis(alpha-hydroxy)alkylated product or a bis-alkylated product.

In other embodiments of the reaction, the substituted anthraquinone comprises of Formula IV:

Formula IV

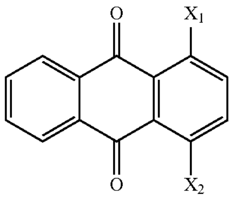

(X = OH or $NH_2$)

Wherein X is a hydroxyl or amino group. In some embodiments $X_1$ and $X_2$ are the same. In other embodiments $X_1$ and $X_2$ are different. Examples of this include 1,4-dihydroxyanthraquinone, 1,4-diaminoanthraquinone, 1-hydroxy-4-aminoanthraquinone, and so on. Anthraquinones of Formulas II, III, and IV which comprise of two X substituents on separate aromatic rings of the same molecule, or two unsubstituted positions each ortho to the X substituents, would be able to react with two equivalents of aldehyde to form a bis(alpha-hydroxy)alkylated product or a bis-alkylated product.

In some embodiments of the invention, the base is selected from the group comprising of: an inorganic hydroxide, a metal alkoxide, an amine, and an amidine and mixtures thereof. In particular embodiments of the invention, the base is an alkali metal hydroxide such as sodium hydroxide or potassium hydroxide. In other embodiments of the invention, the base is a metal alkoxide or alkali metal alkoxide such as sodium methoxide or potassium tert-butoxide. In other embodiments of the invention, the base is an amine or a trialkylamine such as triethylamine or diisopropylethylamine. In other embodiments, the base is an amidine or a non-nucleophilic base such as 1,8-diazabicycloundec-7-ene (DBU) or 1,5-diazabicyclo[4.3.0]non-5-ene (DBN).

In some embodiments of the invention, the base and/or the aldehyde act as the solvent. In other embodiments of the invention, the solvent is a separate species such as water, methanol, ethanol, isopropanol, 1,4-dioxane, N,N-dimethylformamide, and so on.

In some embodiments of the invention, the first and second electrodes 311, 321 may comprise defined flow channels to direct fluid.

In some embodiments of the invention, the first and second electrodes 311, 321 are conductive carbon electrodes. In other embodiments of the invention, the first electrode 311 is a conductive carbon electrode and the second electrode 321 comprises nickel, cobalt, iron, stainless steel, or platinum.

In some embodiments of the invention, the ion-selective membrane 330 is a cation-conducting membrane such as Nafion® 212, FuMATech® E-630, or Selemion CMV-N®.

In some embodiments of the invention, the second fluid stream 322 comprises hydrogen gas. In further embodiments of the invention, the second electrode 321 is configured to allow hydrogen to be oxidized and thereby act as a source of electrons, such as a gas diffusion electrode. In still further embodiments of the invention, the second electrode 321 also contains an electrocatalyst for hydrogen oxidation such as platinum.

In some embodiments of the invention, the second fluid stream 322 comprises methanol. In further embodiments of the invention, the second electrode 321 also contains an electrocatalyst for methanol oxidation such as platinum-ruthenium.

In some embodiments of the invention, the second fluid stream 322 comprises an aqueous solution of a salt of ferrocyanide, such as sodium ferrocyanide, potassium ferrocyanide, or ammonium ferrocyanide.

In some embodiments of the invention, the second fluid stream 322 comprises an aqueous solution of an alkali metal hydroxide such as sodium hydroxide or potassium hydroxide. In further embodiments of the invention, the second electrode 321 comprises a typical alkaline electrolyzer material such as nickel or stainless steel. In further embodiments of the invention, the oxygen produced at the second electrode 321 is used as the oxidant in Treatment 1 to re-oxidize the first fluid stream 311.

In some embodiments of the invention, the aldehyde is not included in the first fluid stream 312, but is only added later to the first fluid stream 312 after the current density in the divided electrolytic cell 300 has fallen below a threshold value, as defined above, or after the applied electric potential rises above a threshold value, or after a predetermined amount of charge has been passed. In further embodiments of the invention, the electric potential 340 between the first and second electrodes 311, 321 is switched to open circuit potential after (a) the current density in the divided electrolytic cell 300 has fallen below a threshold value, (b) after the applied electric potential rises above a threshold value, or (c) after a predetermined amount of charge has been passed, and before the aldehyde is added to the first fluid stream 312.

In some aspects of the invention, the divided electrolytic cell 300 can be used as a redox flow battery cell without having to change out the first or second electrodes 311, 321, or the ion-conducting membrane 330. In further embodiments of the invention, the (alpha-hydroxy)alkylated product or the dehydroxylated, alkylated product that is produced in the first fluid stream 312 using the divided electrolytic cell 300 is not drained from the first chamber 310 of the divided electrolytic cell 300 but is retained in the solution phase and used directly as the negative electrolyte (i.e., the negolyte or anolyte) of a redox flow battery wherein the divided electrolytic cell 300 is the redox flow battery cell. In still further embodiments of the invention, the second fluid stream 322 is not drained from the second chamber 320 of the divided electrolytic cell 300 but is retained in the solution phase and used directly as the positive electrolyte (i.e. the posolyte or catholyte) of a redox flow battery wherein the divided electrolytic cell 300 is the redox flow battery cell. In further embodiments of the invention, both the first and second fluid streams 312, 322 are not drained from the first and second chambers 310, 320 respectively of the divided electrolytic cell 300 but are retained in the solution phase and used directly as the negative and positive electrolytes respectively of a redox flow battery, or as the positive and negative electrolytes respectively of a redox flow battery, wherein the divided electrolytic cell 300 is the redox flow battery cell.

In further embodiments of the invention, the state of charge of the negative and positive electrolytes (formerly the first fluid stream 312 and second fluid stream 322, or, in some other embodiments, the second fluid stream 312 and the first fluid stream 322) can be individually adjusted, or rebalanced, to maximize the capacity of the resulting redox flow battery. For example, the first or second fluid stream 312, 322 can be treated with an oxidant such as oxygen in atmospheric air, hydrogen peroxide, ozone, sodium hypochlorite, and so on, or the first or second fluid stream 312, 322 can be treated with a reducing agent such as hydrogen together with an optional catalyst, hydrazine, hydrazine hydrate, sodium thiosulfate, sodium dithionite, sodium sulfite, and so on.

In some aspects of the invention, the substituted anthraquinone and aldehyde in the first fluid stream 312 are replaced by the intermediate of the same type of reaction described earlier; in other words, a different substituted anthraquinone comprising a hydroxy or amine group in the 1-position, and further comprising a —CH(OH)—R group in the 2-position. In this case, the desired product would be dehydroxylated at the benzylic position of the substituent in the 2-position.

Treatment 1

After a predetermined amount of time, or after a predetermined amount of charge has been passed, the first fluid stream 312 is drained from the first chamber 310 of the divided electrolytic cell 300 and an oxidant is introduced to the first fluid stream 312. In some embodiments of the invention, the oxidant is present in the gas phase and can be air, oxygen, ozone, or mixtures thereof. The oxidant can alternatively be a liquid or present in the solution phase, including but not limited to dimethylsulfoxide or hydrogen peroxide. The oxidant can be a solid such as silver(I) oxide. Combinations of different oxidants may also be employed. After a further predetermined amount of time, the reaction product is isolated from the oxidized first fluid stream and optionally purified through conventional means familiar to one skilled in the art.

Treatment 2

After a predetermined amount of time, or after a predetermined amount of charge has been passed, the second fluid stream 322 is optionally replaced by a third fluid stream 325, and the electrical potential 340 across the first and second electrodes 311, 321 is reversed in sign, such that electrochemical oxidation of the first fluid stream 312 now takes place instead of electrochemical reduction, and electrochemical reduction of the second or third fluid stream 322, 325 now takes place instead of electrochemical oxidation. After a further predetermined amount of time, or passage of a predetermined amount of charge, or the electrical current density falling below a threshold value, or after the applied electric potential rises above a threshold value, the oxidized first fluid stream 312 is drained from the first chamber 310 of the divided electrolytic cell 300, and the reaction product is isolated and optionally purified through conventional means familiar to one skilled in the art.

Treatment 3

After a predetermined amount of time, or after a predetermined amount of charge has been passed, the first fluid stream 312 is drained from the first chamber 310 of the divided electrolytic cell 300. The drained first fluid stream 362 is now flowed through a third chamber 360 past a third electrode 361 of a second divided electrolytic cell 350, which has a third fluid stream 372 flowing through a fourth chamber 370 past a fourth electrode 371 of the second divided electrolytic cell 350. An electric potential 390 is applied to the third and fourth electrodes 361, 371 of the second divided electrolytic cell 350 such that the third electrode 361 is at a more positive potential relative to the fourth electrode 371. (In other words, the third electrode 361 is the anode and the fourth electrode 371 is the cathode 371.) After a further predetermined amount of time, or passage of a predetermined amount of charge, or the electrical current density falling below a threshold value, or after the applied electric potential rises above a threshold value, the drained first fluid stream 362, now oxidized, is drained from the third chamber 360 of the second divided electrolytic cell 350, and the reaction product is isolated and optionally purified through conventional means (reprecipitation, recrystallization, filtration, distillation, washing, extraction, chromatography, etc.) familiar to one skilled in the art.

EXAMPLES

Example 1

Inside a Parr hydrogenator equipped with a mechanical stirrer, 3.00 grams of 1,8-dihydroxyanthraquinone (12.49 mmol), 3.45 grams of glyoxylic acid monohydrate (37.47 mmol, 3 equiv.), and 0.30 grams of 5 wt % palladium on carbon were thoroughly mixed in 100 mL of 1.63 M NaOH solution. The reaction mixture was sparged with hydrogen gas for 3 minutes and then pressurized with hydrogen to reach a pressure of 100 psi. The reaction was stirred at room temperature (~20° C.) for 1 hour, then heated to 80° C. for 1 hour. The vessel was vented, the reaction mixture poured onto sufficient ice to rapidly bring the temperature down to approximately room temperature, then a stream of air was bubbled through the reaction mixture for 30 minutes. The solution was acidified with 6 M hydrochloric acid until pH 8-9, then filtered to remove the palladium/carbon catalyst and unreacted 1,8-dihydroxyanthraquinone. The filtrate was then treated further with concentrated hydrochloric acid until pH~0, causing an ochre solid to precipitate out of solution. The solid was collected by filtration and washed with cold water to give the crude product 1,8-dihydroxy-2,7-bis(carboxymethyl)-9,10-anthraquinone, yield 60%. The solid can be purified by recrystallization from hot water and dried if desired.

Example 2

An electrochemical cell ("MP Cell®", ElectroCell North America, Inc.) with 200 $cm^2$ of electrode area was constructed with a graphite felt cathode, a stainless steel anode, Nafion® 115 membrane, polypropylene flow frames, EPDM gaskets, a cathode reservoir for holding the catholyte, and an anode reservoir for holding the anolyte. The cathode reservoir had a ~2 liter capacity and was maintained under an inert nitrogen atmosphere to prevent reoxidation of the reaction mixture by atmospheric oxygen, while the anode reservoir had a ~10 liter capacity and was open to the atmosphere. Both reservoirs were equipped with heating elements to heat the anolyte and catholyte as needed. First, the anode reservoir was filled with 2 liters of 3 M NaOH. The catholyte was first prepared outside the cathode reservoir by mixing 137 mL of 50% NaOH solution, 33.8 g of glyoxylic acid monohydrate, and 30.0000 grams (124.89 mmol) of 1,8-dihydroxyanthraquinone in sufficient deionized water to bring the total volume of catholyte to around 2.0 liters. The catholyte slurry was added to the cathode reservoir and pumps were started to circulate both the catholyte and anolyte to the electrochemical cell. A further 750 mL of deionized water was added to the catholyte for a final catholyte volume of 2.75 liters. The catholyte and anolyte were warmed to 40° C. and current was passed at a constant current of 40 $mA/cm^2$ (total current 4 A) while the temperature was slowly raised to 50° C. Throughout the operation, oxygen gas is evolved at the anode while the catholyte solution is being reduced. After 2 equivalents of charge with respect to 1,8-dihydroxyanthraquinone were passed (249.78 mmol, 24,100 Coulombs), the temperature was raised to 65° C. and held there until a total of 4.1 equivalents of charge (512.05 mmol, 49,405 Coulombs) were passed. HPLC analysis of an aerated aliquot showed no remaining 1,8-dihydroxyanthraquinone in solution and the target molecule 2,7-bis(carboxymethyl)-1,8-dihydroxyanthraquinone (DCDHAQ) present in ~86% purity. Some of the impurities observed by HPLC (British Pharmacopeia 2004 for Dantron: C18 column eluting isocratically with a mixture of 2.5 volumes of glacial acetic acid, 40 volumes of tetrahydrofuran, and 60 volumes of water at a flow rate of 1 mL/minute, 40 minute run time, detecting at 254 nm) included the intermediate compounds 2,7-bis(alpha-hydroxy-carboxymethyl)-1,8-dihydroxyanthraquinone and 2-(alpha-hydroxy-carboxymethyl)-7-carboxymethyl-1,8-dihydroxyanthraquinone, which can be subsequently converted into the target molecule DCDHAQ by reduction in an electrochemical cell or through the course of cycling inside a flow battery cell. Other impurities include the anthrones and dianthrones, such as 2,2'-(1,8-dihydroxy-9-oxo-9,10-dihydroanthracene-2,7-diyl)diacetic acid, 2,2'-(1,8-dihydroxy-10-oxo-9,10-dihydroanthracene-2,7-diyl)diacetic acid, 2,2',2'',2'''-(4,4',5,5'-tetrahydroxy-10,10'-dioxo-9,9',10,10'-tetrahydro-[9,9'-bianthracene]-3,3',6,6'-tetrayptetraacetic acid, and related isomers. Generally, the anthrones and dianthrones can be subsequently converted into the target molecule DCDHAQ by oxidation in an electrochemical cell, extended exposure to atmospheric oxygen, or through the course of cycling inside a flow battery cell; reference *ChemRxiv* 2021, DOI: 10.26434/chemrxiv-2021-x05x1. Consequently, the catholyte solution from this synthesis can be used directly as a flow battery negolyte reactant without any downstream processing, except for some optional concentration through solvent evaporation, to save on costs and cut down on chemical waste. To isolate the product DCDHAQ, the catholyte solution was drained through a filter, exposed to air to fully reoxidize the solution, and refiltered. The filtrate was acidified with 15% hydrochloric acid until pH<1, and then the precipitated solid was filtered off and dried overnight at 45° C. The dried solid was orange to dark red upon grinding. Isolated yield: 30.1393 grams (67.7%), melting point 260-262° C. Most of the loss appeared to be from hard nodules of unreacted, undissolved 1,8-dihydroxyanthraquinone that remained unreacted and were later removed by filtration. The solid can be repurified to >98% purity of DCDHAQ (HPLC) if so desired by dissolving 1 gram of solid in 4 mL of dimethyl sulfoxide, adding 12 mL of deionized water to form a precipitate, followed by filtering the precipitate, washing it with deionized water, and drying. The NMR spectrum of the DCDHAQ produced in this example was identical to the literature; reference *J. Mater. Chem. A,* 2021, 9, 26709-26716. $^1$H NMR (500 MHz, DMSO-$d_6$) δ 12.43 (s, 2H), 12.24 (s, 2H), 7.76 (dd, J=7.5 Hz, 2H), 7.68 (dd, J=7.5 Hz, 2H), 3.71 (s, 4H). Example 3

A solution of 2,7-bis(alpha-hydroxy-carboxymethyl)-1,8-dihydroxyanthraquinone is first prepared by stirring 2.60 liters of deionized water, 78 mL of 50% NaOH, 128 mL of 45% KOH, 80.9 g of 1,8-dihydroxyanthraquinone, and 70.6 g of sodium dithionite under argon for 5 minutes at room temperature, then adding a solution of 91.7 g of glyoxylic acid monohydrate in 200 mL of solution comprising 0.5 M NaOH and 0.5 M KOH, this solution being added dropwise over 256 minutes using an addition funnel. Once the addition was complete, the reaction mixture was exposed to air and filtered to produce a solution of 2,7-bis(alpha-hydroxy-carboxymethyl)-1,8-dihydroxyanthraquinone along with excess NaOH/KOH and other reactants. Separately, as in Example 2, an electrochemical cell ("MP Cell®", ElectroCell North America, Inc.) with 200 $cm^2$ of electrode area was constructed with a graphite felt cathode, a stainless steel anode, Nafion® 115 membrane, polypropylene flow frames, EPDM gaskets, a cathode reservoir for holding the catholyte, and an anode reservoir for holding the anolyte. The cathode reservoir had a ~2 liter capacity and was maintained under an inert nitrogen atmosphere to prevent reoxidation of the reaction mixture by atmospheric oxygen, while the anode reservoir had a ~10 liter capacity and was open to the atmosphere. Both reservoirs were equipped with heating elements to heat the anolyte and catholyte as needed. The solution of 2,7-bis(alpha-hydroxy-carboxymethyl)-1,8-dihydroxyanthraquinone was then preheated to 65° C. and poured into the cathode reservoir, and maintained under nitrogen. Separately, 4 liters of 3 M NaOH solution was preheated to 65° C. and poured into the anode reservoir, and kept open to the air. The catholyte and anolyte solutions were circulated using pumps to the cathode and anode chambers of the electrochemical cell respectively and electrical current was passed at a constant current density of 50 $mA/cm^2$ (10 A total current) while the temperature of the solutions was maintained within a range of 51-71° C. The current was stopped when 4 molar equivalents of charge (34.98 Ah) had been passed. Near the end of the experiment, the cell voltage rose sharply from an original value of 1.5-1.6 V, where it had been for the majority of the experiment, to 2.3-2.4 V. The catholyte was drained from the cathode reservoir, reoxidized by exposure to atmospheric oxygen, and filtered to remove any solids. The filtrate was acidified with 15% HCl until pH~1, and the precipitated material was filtered, rinsed with water, and dried. The crude material was redissolved in aqueous KOH, reacidified, recollected by filtration and washed again with water to give the target molecule 2,7-bis(carboxymethyl)-1,8-dihydroxyanthraquinone. Yield with respect to 1,8-dihydroxyanthraquinone: 80.0 g (66.7%). Most losses came from incomplete dissolution of 1,8-dihydroxyanthraquinone that was removed unreacted in the first filtration.

Unless otherwise indicated, all numbers expressing feature sizes, amounts, volumes, areas, concentration, times, temperatures, and other chemical and physical properties used in the specification and claims are to be understood as being modified in all instances by the term "about". Accordingly, unless indicated to the contrary, the numerical parameters set forth in the foregoing specification and attached claims are approximations that can vary depending on the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5; <10% includes 10%, 9.8%, 5.5%, 2%, 0.01%, and 0%; >90% includes 90%, 90.2%, 94.5%, 98%, 99.99%, and 100%) and any range within that range.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A system comprising:

a divided electrolytic cell, further comprising:

a first chamber comprising a first electrode, and a first fluid stream, the first fluid stream comprising:

an anthraquinone derivative of Formula I, Formula II, Formula III, or

Formula IV:

Formula I

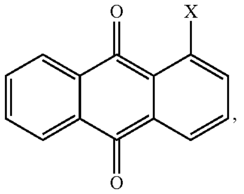

Formula II

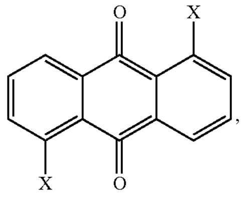

Formula III

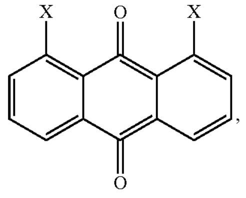

Formula IV

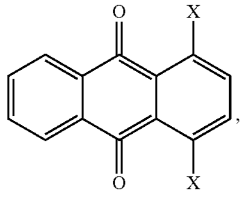

wherein each X independently is OH or $NH_2$;

the first fluid stream further comprising an aldehyde, a base, and an optional solvent;

a second chamber comprising a second electrode, and a second fluid stream;

the first chamber and first electrode separated by an ion-conducting membrane from the second chamber and second electrode;

wherein the first fluid stream further comprises an (alpha-hydroxy)alkylated anthraquinone derivative and/or an alkylated anthraquinone derivative.

2. The system of claim 1, wherein the first fluid stream is configured to be recirculated to the first chamber and the second fluid stream is configured to be recirculated to the second chamber.

3. The system of claim 1, wherein at least one of the first electrode and second electrode comprise an electrocatalyst or electrocatalyst precursor.

4. The system of claim 1, further comprising an electrical power supply configured to apply an electrical potential between the first electrode and the second electrode.

5. The system of claim 1, wherein the base is an inorganic hydroxide, a metal alkoxide, an amine, an amidine, or a mixture thereof.

6. The system of claim 5, wherein the base is sodium hydroxide, potassium hydroxide, or a mixture thereof.

7. The system of claim 1, wherein the solvent is water.

8. The system of claim 1, wherein the ion-conducting membrane is a cation exchange membrane.

9. The system of claim 6, wherein:

the ion-conducting membrane is a cation exchange membrane;

the second fluid stream comprises an aqueous solution comprising sodium hydroxide, potassium hydroxide, or a mixture thereof;

the second electrode comprises nickel, cobalt, iron, stainless steel, platinum, or a mixture thereof; and the solvent comprises water.

10. The system of claim 9, wherein the oxygen produced at the second electrode is used to reoxidize the first fluid stream after electrochemical reduction has concluded.

11. The system of claim 6, wherein:

the ion-conducting membrane is a cation exchange membrane;

the second fluid stream comprises hydrogen gas;

the second electrode is configured to allow hydrogen to be oxidized and thereby act as a source of electrons;

and wherein the system further comprises a solvent, the solvent comprising water.

12. The system of claim 11, wherein the second electrode further comprises an electrocatalyst comprising of platinum.

13. The system of claim 6, wherein:

the ion-conducting membrane is a cation exchange membrane;

the second fluid stream comprises methanol; and the solvent comprises water.

14. The system of claim 13, wherein the second electrode further comprises an electrocatalyst comprising of platinum-ruthenium.

15. A redox flow battery comprising:

a divided electrolytic cell, further comprising:

a first chamber comprising a first electrode and first fluid stream, the first fluid stream comprising an anthraquinone derivative of Formula I, Formula II, Formula III, or Formula IV:

Formula I

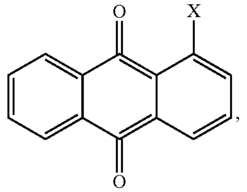

Formula II

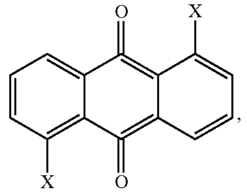

Formula III

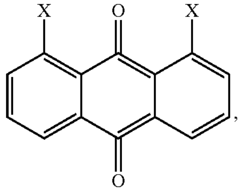

Formula IV

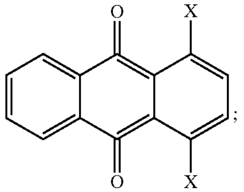

wherein each X independently is OH or $NH_2$;

the first fluid stream further comprising an aldehyde, a base, and an optional solvent;

a second chamber comprising a second electrode and a second fluid stream;

the first chamber and first electrode separated by an ion-conducting membrane from the second chamber and second electrode;

wherein the first fluid stream further comprises an (alpha-hydroxy)alkylated anthraquinone derivative and/or an alkylated anthraquinone derivative; and wherein the divided electrolytic cell the (alpha-hydroxy) alkylated anthraquinone derivative and/or the alkylated anthraquinone derivative as a first flow battery reactant, and the second fluid stream as a second flow battery reactant.

16. The system of claim 15, wherein:

the ion-conducting membrane is a cation exchange membrane;

the first and second fluid streams comprise an aqueous solution selected from the group comprising sodium hydroxide, potassium hydroxide, or a mixture thereof;

wherein the first and second electrodes are selected from the group comprising graphite, carbon black, carbon felt, carbon cloth, carbon paper, carbon nanotubes, other forms of conductive carbon, or a mixture thereof;

and wherein the system further comprises a solvent, the solvent comprising water.

17. The system of claim 16, wherein the second fluid stream additionally comprises sodium ferrocyanide, sodium ferricyanide, potassium ferrocyanide, potassium ferricyanide, or combinations thereof.

18. A method for the (alpha-hydroxy)alkylation or alkylation at the 2-position of an anthraquinone derivative, comprising:

providing a divided electrolytic cell, further comprising:

a first chamber with a first electrode, configured to accept and have an electrochemical reaction with a first fluid stream comprising said anthraquinone derivative of Formula I, Formula II, Formula III, or Formula IV:

Formula I

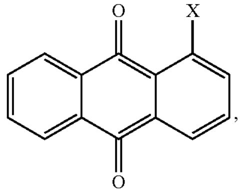

Formula II

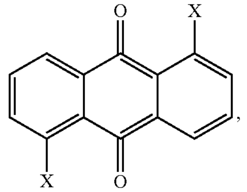

Formula III

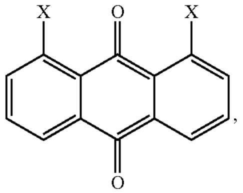

Formula IV

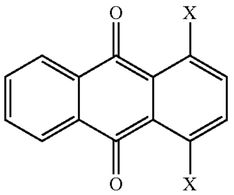

wherein each X independently is OH or $NH_2$;

the first fluid stream further comprising an aldehyde, a base, and an optional solvent;

a second chamber with a second electrode, configured to accept and have an electrochemical reaction with a second fluid stream;

the first chamber and first electrode separated by an ion-conducting membrane from the second chamber and second electrode;

flowing the first fluid stream through the first chamber and contacting the first electrode;

flowing the second fluid stream through the second chamber and contacting the second electrode; and applying an electrical potential between the first and second electrode, so as to cause an electrochemical reduction reaction in the first fluid stream and an electrochemical oxidation reaction in the second fluid stream;

wherein the first fluid stream further comprises an (alpha-hydroxy)alkylated anthraquinone derivative and/or an alkylated anthraquinone derivative.

19. The method of claim 18, wherein the first fluid stream is configured to recirculate back to the first chamber with the first electrode.

20. The method of claim 18, further comprising:

waiting until a threshold amount of time or charge has passed, or until the current density has dropped below a threshold value, or after the applied electric potential rises above a threshold value;

draining the first fluid stream from the first chamber;

introducing an oxidant to the reaction mixture obtained from the drained first fluid stream; and isolating the product from the reaction mixture.

21. The method of claim 18, further comprising:

waiting until a threshold amount of time or charge has passed, or until the current density has dropped below a threshold value, or after the applied electric potential rises above a threshold value;

reversing the sign of the electrical potential between the first and second electrodes, such that an electrochemical oxidation reaction occurs in the first fluid stream and an electrochemical reduction reaction occurs in the second fluid stream;

waiting until a threshold amount of time or charge has passed, or until the current density has dropped below a threshold value, or after the applied electric potential rises above a threshold value;

draining the first fluid stream from the first chamber; and isolating the product from the reaction mixture obtained from the drained first fluid stream.

22. The method of claim 18, further comprising:

waiting until a threshold amount of time or charge has passed, or until the current density has dropped below a threshold value, or after the applied electric potential rises above a threshold value;

replacing the second fluid stream with a third fluid stream;

reversing the sign of the electrical potential between the first and second electrodes, such that an electrochemical oxidation reaction occurs in the first fluid stream and an electrochemical reduction reaction occurs in the third fluid stream;

waiting until a threshold amount of time or charge has passed, or until the current density has dropped below a threshold value, or after the applied electric potential rises above a threshold value;

draining the first fluid stream from the first chamber; and isolating the product from the reaction mixture obtained from the drained first fluid stream.

23. The method of claim 18, further comprising:

waiting until a threshold amount of time or charge has passed, or until the current density has dropped below a threshold value, or after the applied electric potential rises above a threshold value;

draining the first fluid stream from the first chamber to produce an intermediate fluid stream;

providing a second divided electrolytic cell, further comprising:

a third chamber with a third electrode, configured to accept and have an electrochemical reaction with said intermediate fluid stream;

a fourth chamber with a fourth electrode, configured to accept and have an electrochemical reaction with a third fluid stream;

the third chamber and third electrode separated by a second ion-conducting membrane from the fourth chamber and fourth electrode;

flowing the intermediate fluid stream into the third chamber and contacting the third electrode of the second divided electrolytic cell;

flowing a third fluid stream into the fourth chamber and contacting the fourth electrode of the second divided electrolytic cell; and applying an electrical potential between the third and fourth electrode, so as to cause an electrochemical oxidation reaction in the intermediate fluid stream, and an electrochemical reduction reaction in the third fluid stream.

24. The method of claim 23, wherein the intermediate fluid stream is configured to recirculate back to the third chamber with the third electrode.

25. The method of claim 23, further comprising:

waiting until a threshold amount of time or charge has passed, or until the current density has dropped below a threshold value, or after the applied electric potential rises above a threshold value;

draining the intermediate fluid stream from the third chamber to produce a product fluid stream; and isolating the product from the product fluid stream.

* * * * *